(12) United States Patent
Bull et al.

(10) Patent No.: US 11,059,468 B2
(45) Date of Patent: Jul. 13, 2021

(54) BRAKING CONTROL DEVICE FOR VEHICLE

(71) Applicant: ADVICS CO., LTD., Kariya (JP)

(72) Inventors: Marshall Bull, Nagoya (JP); Shun Tsukamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 104 days.

(21) Appl. No.: 16/500,022

(22) PCT Filed: Mar. 29, 2018

(86) PCT No.: PCT/JP2018/013387
§ 371 (c)(1),
(2) Date: Oct. 1, 2019

(87) PCT Pub. No.: WO2018/186285
PCT Pub. Date: Oct. 11, 2018

(65) Prior Publication Data
US 2020/0130667 A1 Apr. 30, 2020

(30) Foreign Application Priority Data

Apr. 5, 2017 (JP) .............................. JP2017-075441

(51) Int. Cl.
*B60T 13/74* (2006.01)
*B60T 8/40* (2006.01)
*F16D 63/00* (2006.01)

(52) U.S. Cl.
CPC .......... *B60T 13/745* (2013.01); *B60T 8/4022* (2013.01); *F16D 63/002* (2013.01); *B60T 2270/311* (2013.01); *F16D 2500/1023* (2013.01)

(58) Field of Classification Search
CPC ........ B60T 8/17; B60T 8/4022; B60T 13/662; B60T 13/745; B60T 13/686; B60T 7/042;
(Continued)

(56) References Cited

U.S. PATENT DOCUMENTS 4,546,297 A * 10/1985 Washbourn ........... B60T 8/1893
188/162
4,546,298 A * 10/1985 Wickham .............. B60T 8/1893
188/162
(Continued)

FOREIGN PATENT DOCUMENTS

CN 204567642 U 8/2015
JP 2011219064 A 11/2011

OTHER PUBLICATIONS

International Search Report (PCT/ISA/210) dated Jun. 19, 2018, by the Japanese Patent Office as the International Searching Authority for International Application No. PCT/JP2018/013387.

*Primary Examiner* — Robert A. Siconolfi
*Assistant Examiner* — San M Aung
(74) *Attorney, Agent, or Firm* — Buchanan Ingersoll & Rooney PC (57) ABSTRACT

This braking control device comprises a differential mechanism, a first electric motor that generates assisting force in a braking operation member, a second electric motor that adjusts output rod shift of the differential mechanism, and a controller that controls the first and second electric motors. In the controller, the first electric motor is controlled on the basis of an assistance map in which the assisting force is calculated, and the second electric motor is controlled on the basis of a displacement map in which the output rod shift is calculated. When the displacement map is changed, the assistance map is corrected as well.

6 Claims, 5 Drawing Sheets

(58) Field of Classification Search
CPC .............. B60T 2270/311; F16D 63/002; F16D 2500/1023; F16D 2066/003; F16D 2066/005
USPC .......... 303/3, 152; 188/173; 192/90, 111.12; 477/4, 29
See application file for complete search history.

(56) References Cited

U.S. PATENT DOCUMENTS

| | | | |
|---|---|---|---|
| 4,651,852 A * | 3/1987 | Wickham .............. | B60T 8/1893 188/173 |
| 2002/0056601 A1* | 5/2002 | Inoue ...................... | F16H 61/32 192/3.62 |
| 2016/0339890 A1* | 11/2016 | Cann ..................... | B60T 13/745 |

* cited by examiner

BRAKING CONTROL DEVICE FOR VEHICLE

BACKGROUND

The present invention relates to a braking control device for vehicle.

Patent Document 1 describes a technical matter "which is aimed to provide a compact and simplified stroke simulator having the same brake pedal operation feeling when a non-regenerative cooperative brake is operated and when a regenerative cooperative brake is operated, and in which a rotation fulcrum of a brake pedal, a planetary gear mechanism, and a push-rod arm for driving a push-rod connected to a master cylinder are coaxially aligned so that causing the rotation of a reversible motor to act on the planetary gear mechanism to perform correction control so that when regenerative cooperative braking is activated, a brake pedal stroke diagram corresponding to the brake pedal input during non-regenerative cooperative braking is achieved.".

More specifically, it is described that "a device comprising a brake pedal, a master cylinder connected to a wheel brake, a motor capable of forward and reverse rotation, and a planetary gear mechanism, which causes rotation of the motor to act on the planetary gear mechanism to vary an operation amount of the brake pedal and an operation amount of a push rod linked to the master cylinder", wherein "as the planetary carrier 40 of the planetary gear mechanism is rotated in the retard angle direction, the operation amount of the push-rod arm 38a with respect to the operation amount of the brake pedal 11 is reduced.". Further, as an applied control, "when the planetary carrier 40 of the planetary gear mechanism is rotated in the advance angle direction, the operation amount of the push rod arm 38a is increased with respect to the operation amount of the brake pedal 11. Thus, the operation amount of the brake pedal 11 is reduced with respect to the actuation amount of the push rod arm 38a".

In the device (stroke simulator) described in Patent Document 1, the feeling of stepping on a plate is eliminated by variably controlling the operation amount of the push rod arm with respect to the operation amount of the brake pedal (displacement Sbp of the braking member). However, an operating force Fbp of the brake pedal depends on the output hydraulic pressure Pma of the master cylinder and the output of the electric motor. Therefore, it is still necessary to improve the characteristic CHbp (referred to as "operating characteristic") in the relationship between the operation displacement Sbp and the operation force Fbp when the variable control is executed.

This technical matter will be described in detail. In a common vehicle, an assistor (which is also referred to as "booster" in Japanese Patent Application Laid-Open No. H08-092407, a vacuum booster is disclosed.) is provided in addition to the stroke simulator. The power factor ratio Bst (ratio of the final output to the driver's operating force Fbp) of the booster is determined by the specifications of the braking device. For example, in a vehicle having a relatively small power factor ratio Bst, the operating force Fbp generated by the driver is somewhat dominant. Therefore, when the characteristic CHpm (referred to as "hydraulic characteristics") of the output hydraulic pressure Pma with respect to the operation amount Bpa is increased, the force Fpn received from the master cylinder MC is increased, and the operation of the braking operation member BP is felt heavy. By changing the hydraulic pressure characteristic CHpm, the driver may feel that the so-called assist (that is, the supporting force Fjs) is insufficient.

On the other hand, in a vehicle having a relatively large power factor ratio Bst, the driver's operating force Fbp has a small contribution to the output hydraulic pressure Pma. Therefore, when the hydraulic pressure characteristic CHpm is increased, a large braking hydraulic pressure Pma (which results in a deceleration Gxa of the vehicle) is generated with a small braking operation amount Bpa (for example, the operational displacement Sbp). The hydraulic pressure characteristic CHpm allows the driver to feel that the operation of the braking operation member BP has become sensitive.

As described above, when the brake fluid pressure Pma (that is, the output displacement Sro) with respect to the braking operation amount Bpa is variably controlled, it is desired that the operation characteristic CHbp can be suitably maintained so that the discomfort to the driver is reduced.

CITED REFERENCE

Patent Document

Patent Document 1: JP-A-2011-219064

SUMMARY OF THE INVENTION

Means for Solving the Problem

An object of the present invention is to provide an article device which can variably control a characteristic CHpm of a hydraulic pressure Pma generated by a master cylinder MC with respect to an operating displacement Sbp of a braking operation member BP, and which can suitably maintain an operating characteristic CHbp (i.e., the relationship between an operation displacement Sbp and an operation force Fbp) of the braking operation member BP when the characteristic CHpm is changed.

Means for Solving the Problem

A braking control device for vehicle of the present invention, which pumps a braking fluid from a master cylinder (MC) to a wheel cylinder (WC) in accordance with an operation of a braking operation member (BP) of a vehicle to generate braking torque on wheels (WH) of the vehicle, is configured to include an operation amount sensor (BPA) for detecting an operation amount (Bpa) of the braking operation member (BP), an input rod (RDI) connected to the braking operation member (BP), an output rod (RDO) which is movable parallel to a central axis (Jin) of the input rod (RDI) and which presses a piston (PNA) in the master cylinder (MC), a first electric motor (MTF) that generates an assist force (Fjs) to the input rod (RDI), a second electric motor (MTS) that adjusts an output displacement (Sro) of the output rod (RDO), a differential mechanism (DFR) which is configured to include a first transmission mechanism (PNF&Gfa) that transmits an output of the first electric motor (MTF) to the input rod (RDI), a second transmission mechanism (PNS&Gsa, PNO&Gsb) that transmits an output of the second electric motor (MTIS) to the output rod (RDO), and a third transmission mechanism (PNO&Gfb) that transmits an output of the input rod (RDI) to the output rod (RDO), and that adjusts a relative movement between the input rod (RDI) and the output rod (RDO), and a controller (ECU) which controls, on the basis of the operation amount, the first electric motor (MTF) and the second electric motor (MTS).

In the braking control device for vehicle, the controller (ECU) controls the first electric motor (MTF) on the basis of an assistant map (EZim) for calculating an assist force (Fjs) with respect to the operation amount (BPa), controls the second electric motor (MTS) on the basis of displacement maps (EZmk, EZmj) for calculating the output displacement (Sro) with respect to the operation amount (BPa), and modifies the displacement maps (EZmk, EZmj) when changing the assistant map (EZim).

The operation reaction force (operating force) Fbp of the braking operation member BP is generated by a force exerted from the piston PNA by the brake fluid pressure Pma. Accordingly, when the characteristic (hydraulic characteristics) CHpm of the master cylinder hydraulic pressure Pma with respect to the braking operation displacement Sbp is controlled in a variable manner by the second electric motor MTS, the operating force Fbp changes due to the change of the hydraulic characteristic CHpm. According to the above configuration, when the hydraulic pressure characteristic CHpm is changed, the assist force Fjs generated by the first electric motor MTF is adjusted. By adjusting the assist force Fjs, the variation of the operating force Fbp can be compensated and the discrepancy with the driver can be eliminated.

The braking control device for vehicle is applied to a vehicle equipped with a regenerative braking device (EDS) which converts kinetic energy into electric energy to obtain regenerative braking force (Rga), and generates a braking torque on the wheels (WH) of the vehicle by pumping braking fluid under pressure from a master cylinder (MC) to the wheel cylinders (WC) in accordance with an operation of the braking operation member (BP) of the vehicle.

A braking control device for vehicle according to the present invention is configured to include an operation amount sensor (BPA) for detecting an operation amount (Bpa) of a braking operation member (BP), an input rod (RDI) connected to the braking operation member (BP), and the output rod (RDO) movable parallel to the central axis (Jin) of the input rod (RDI) and that presses a piston (PNA) in the master cylinder (MC) to generate an output force (Fjs) against an output rod (RDO) that presses the piston (PNA), a first electric motor (MTF) that generates an assist force (Fjs) against the input rod (RDI), and a second electric motor (MTS) that adjusts an output displacement (Sro) of the output rod (RDO), "a differential mechanism (DFR) configured to include a first transmission mechanism (PNF & Gfa) which transmits the output of the first electric motor (MTF) to the input rod (RDI), a second transmission mechanism (PNS & Gsa, PNO & Gsb) which transmits the output of the second electric motor (MTS) to the output rod (RDO), and a third transmission mechanism (PNO & Gfb) which transmits the output of the input rod (RDI) to the output rod (RDO), and adjusting the relative movement between the input rod (RDI) and the output rod (RDO)", and a controller (ECU) that controls the first electric motor (MTF) and the second electric motor (MTS) based on the operation amount (Bpa) and the regenerative braking force (Rga, Rgt). According to this configuration, suitable operation characteristics can be secured in the regenerative coordinated control.

MODE FOR CARRYING OUT THE INVENTION

<Symbols of Elements, etc., Subscripts at the End of the Symbols, and Moving Directions>

An embodiment of a braking control device for vehicle according to the present invention will be described with reference to the drawings. In the following description, the constituent members, arithmetic processing, signals, characteristics, and values denoted by the same reference numerals, such as "ECU", have the same functions. In addition, a subscript ("fr", etc.) attached to the end of each symbol is a generic symbol indicating which wheel relates to. More specifically, "fr" indicates the front right wheel, "fl" indicates the front left wheel, "rr" indicates the rear right wheel, and "rl" indicates the rear left wheel. For example, in each wheel cylinder, it is referred to as a right front wheel cylinder WCfr, a left front wheel cylinder WCfl, a right rear wheel cylinder WCrr, and a left rear wheel cylinder WCrl. Furthermore, the subscript at the end of the symbol may be omitted. If omitted, the symbol for each wheel represents a generic name. Accordingly, "WH" represents a wheel, "WC" represents a wheel cylinder, "CP" represents a caliper, and "KT" represents a rotating member.

In the moving direction (in particular, linear motion) of each component, "forward direction" corresponds to a direction in which the hydraulic pressures Pma and Pmb of the master cylinder MC increase and the braking torque of the wheel WH increases. On the contrary, "backward direction" corresponds to a direction in which the hydraulic pressures Pma and Pmb of the master cylinder MC decrease and the braking torque of the wheel WH decreases. Further, in the component that rotates, "forward direction" corresponds to a direction in which the hydraulic pressures Pma and Pmb of the master cylinder MC increase and the braking torque of the wheel WH increases. On the other hand, "reverse direction" corresponds to a direction in which the hydraulic pressures Pma and Pmb of the master cylinder MC decrease and the braking torque of the wheel WH decreases. Therefore, in the state where the respective components are assembled, "forward direction" and "normal direction" correspond to each other, and "backward direction" and "reverse direction" correspond to each other.

<First Embodiment of the Braking Control Device According to the Present Invention>

Figure 1:
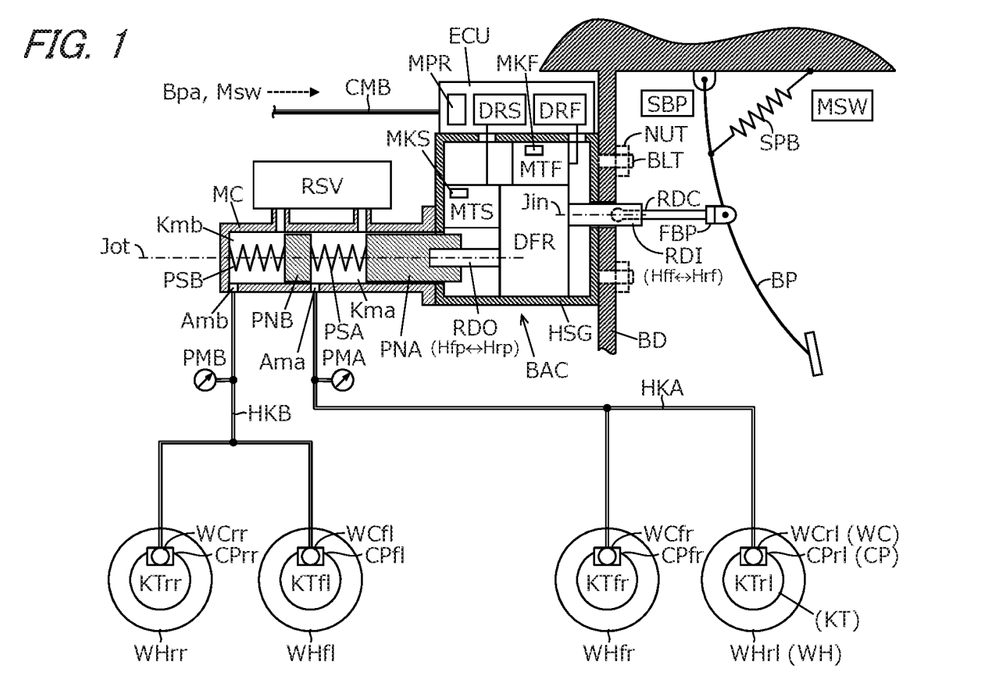
FIG. 1 is an overall configuration diagram showing an embodiment of a braking control device for vehicle according to the present invention.

A vehicle equipped with an embodiment of a braking control device according to the present invention will be described with reference to the overall configuration diagram of FIG. 1. The vehicle is provided with a braking operation member BP, an instruction switch MSW, an operation amount sensor BPA, a braking actuator BAC, an electronic control unit ECU, a tandem master cylinder (also referred to simply as "master cylinder") MC, and first and second fluid paths HKA and HKB. The first and second fluid paths HKA and HKB are also referred to as "brake pipes" and are simply referred to as "HK".

Each of wheels WHfr, WHfl, WHrr, WHrl of the vehicle is provided with each of brake calipers CPfr, CPfl, CPrr, CPrl (each of which is also called simply "caliper"), each of wheel cylinders WCfr, WCfl, WCrr, WCrl, and each of rotating members KTfr, KTfl, KTrr, KTrl. The master cylinder MC, the fluid path HK, and the wheel cylinder WC are in a liquid-tight state.

A braking operation member (for example, a brake pedal) BP is a member that a driver operates to decelerate the vehicle. The braking operation member BP is attached to a vehicle body BD in a pivotal manner. The operating member BP is provided with a return spring SBP (for example, a tension spring) so as to return the operating member BP during non-braking state. An operation displacement sensor SBP is provided at a fixing portion between the braking operation member BP and a vehicle body BD. The operation displacement sensor SBP detects an operation displacement Sbp. By, operating the operating member BP, the braking torque of the wheel WH is adjusted to generate a braking force on the wheel WH.

More specifically, a rotating member (for example, a brake disc) KT is fixed to the wheel WH of the vehicle. The caliper CP is disposed so as to sandwich the rotating member KT. The caliper CP is provided with a wheel cylinder WC. As a pressure (hydraulic pressure) of a braking liquid in the wheel cylinder WC increases, a friction member (for example, a brake pad) is pressed against the rotating member KT. Since the rotating member KT and the wheel WH are fixed to rotate in unison, a braking torque is generated on the wheel WH by the frictional force generated at this time, and as a result, a braking force (frictional braking force) is generated.

The instruction switch MSW is a member by which the driver instructs the braking characteristics of the vehicle. For example, the instruction switch MSW switches between a "Normal mode nmd" and a "Sport mode smd" to give an instruction. The instruction switch MSW outputs an instruction signal Msw to an electronic control unit ECU. In the sport mode (Msw=smd), the braking operation member BP can be operated with a smaller displacement than in the normal mode (Msw=nmd). The so-called short-stroke of the braking operation member BP can be achieved.

The operation amount sensor BPA is provided on the braking operation member BP. The operation amount sensor BPA acquires an operation amount (braking operation amount) Bpa of the braking operation member BP by the driver. More specifically, at least one of an "operation displacement sensor SBP for detecting an operation displacement Sbp of the operation member BP" and an "operation force sensor FBP for detecting an operation force Fbp of the operation member BP" is employed as the operation amount sensor BPA. In other words, the operation amount sensor BPA is a generic name for the operation displacement sensor SBP and the operation force sensor FBP. A braking operation amount Bpa is input to the electronic control unit ECU.

The brake actuator (which is also referred to simply as "actuator") BAC controls, in an independent manner, the relationship between the operating force Fbp (i.e., a force acting on an input rod RDI) acting on the brake operating member BP and the piston displacement (i.e., a displacement Sro of an output rod RDO) of the master cylinder MC. The actuator BAC, includes a housing HSG, a first electric motor MTF, a second electric motor MTS, the input rod RDI, the output rod RDO, and a differential mechanism DFR.

The housing HSG is a box-shaped member having a space therein. In the interior of the housing HSG, members, such as the differential mechanism DFR, which constitute the actuator BAC are housed. The housing HSG is fixed to the vehicle body BD of the vehicle by mounting bolts BLT and nuts NUT. The master cylinder MC is fixed to the housing HSG on the side opposite to the fixing portion of the actuator BAC with respect to the vehicle body BD.

Inside the housing HSG, the first electric motor MTF and the second electric motor MTS are fixed. The first electric motor MTF and the second electric motor MTS are separate electric motors. Therefore, the two electric motors MTF and MTS are accommodated in the housing HSG. An output (first rotating shaft Shf) of the first electric motor MTF and an output (second rotating shaft Shs) of the second electric motor MTS are input to the differential mechanism DFR.

The first electric motor MTF is provided with a first rotation angle sensor MKF so as to detect an actual rotation angle (first rotation angle) Mkfa. The second electric motor MTS is provided with a second rotation angle sensor MKS so as to detect an actual rotation angle (second rotation angle) Mksa. The first and second rotation angles (detected values) Mkfa and Mksa are transmitted to the electronic control unit ECU.

The input rod RDI is mechanically connected to the braking operation member BP via a connection rod RDC. More specifically, the connecting rod RDC is mechanically connected to the braking operation member BP, and the connecting rod RDC and the input rod. RDI are mechanically connected to each other. The braking operation member (brake pedal) BP pivots around the attaching portion to the vehicle body BD, and this pivotal movement is absorbed by the connection rod RDC and converted into a linear movement of the input rod RDI.

An operation force sensor FBP is provided at a mounting portion of the connecting rod RDC and the braking operation member BP. An operation force Fbp is detected by the operation force sensor FBP. The input rod RDI is assembled to the housing HSG in a state capable of moving linearly in the direction of its center axis line (which is also called "input axis line") Jin. The output of the input rod RDI is input to the differential mechanism DFR.

Similar to the input rod RDI, the output rod RDO is assembled to the housing HSG in a state capable of moving linearly in the direction of its center axis Jot (which is also called "output axis line"). The output rod RDO is an output member of the actuator BAC and presses the piston PNA in the master cylinder MC at its end. The input, output rods RDI, RDO are two different rod members that are mounted in the housing HSG in a moveable condition relative to each other.

The differential mechanism DFR controls the output of the first electric motor MTF and the output of the second electric motor MTS individually. The first and second electric motors MTF and MTS are collectively referred to as "MT". The force (i.e., the operation force of the braking operation member BP) Fbp acting on the input rod RDI and the displacement of the output rod RDO (i.e., the displacement of the piston PNA) Sro are independently adjusted by the two electric motors MT. Here, the outputs of the first and second electric motors MTF and MTS are the rotation direction and the magnitude of the torque in the respective electric motors.

The differential mechanism DFR within the housing HSG allows the relative movement between the input rod RDI and the output rod RDO to be adjusted. The outputs of the first and second electric motors MTF and MTS are input to the differential mechanism DFR. Then, a force (auxiliary force Fjs which will be described below) is applied to the input rod RDI by the first electric motor MTF via the differential mechanism DFR. The displacement Sro of the output rod RDO is controlled (adjusted) by the second electric motor MTIS via the differential mechanism DFR.

The electronic control unit (which is also called "controller") ECU controls the first and second electric motors MTF and MTS based on the operation amount Bpa. A control algorithm for controlling the two electric motors MT is programmed in the microprocessor MPR of the controller ECU, to calculate a control signal. In addition, a first drive circuit DRF for driving the first electric motor MTF and a second drive circuit DRS for driving the second electric motor MTS are provided in the controller ECU. The first and second drive circuits DRF and DRS (which are also collectively referred to as "DR") are electric circuits made up of a plurality of switching elements, and are controlled by a microprocessor MPR. The first and second drive circuits DRF and DRS are provided with an energization amount sensor (for example, a current sensor) so as to detect actual energization amounts to the first and second electric motors MTF and MTS.

Controlling the first and second electric motors MTF and MTS renders a relationship between the force Fbp acting on the input rod RDI and the displacement Sro of the output rod RDO under an independent control. That is, the relationship (hydraulic characteristics) CHpm between the operating characteristic (relationship between operation displacement Sbp and operation force Fbp) CHbp of the braking operation member BP and the operating amount Bpa and the hydraulic pressure Pma (resulting in frictional braking force generated by the friction material) can be arbitrarily set.

The master cylinder MC is mechanically connected to the output rod RDO. Two fluid paths HKA and HKB are fluidly connected to the master cylinder MC. When the brake operating member BP is operated, the brake fluid (braking fluid) is discharged (pumped out) from the master cylinder MC to the fluid paths HK, and the brake fluid in the four wheel cylinders WC are pressurized. Inside the components from the master cylinder MC to the Wheel cylinder WC, the brake fluid is filled in a liquid-tight manner.

In the master cylinder MC, its inner wall and the two pistons PNA and PNB define hydraulic chambers Kma and Kmb. The master cylinder MC is a so-called tandem type master cylinder. In the diagonal type fluid path construction, the first fluid pressure chamber Kma of the master cylinder MC is fluidly connected to the wheel cylinders WCfr and WCrl through the first fluid path HKA.

The second hydraulic pressure chamber Kmb of the master cylinder MC is fluidly connected to the wheel cylinders WCfl and WCrr through the second fluid path B. The configuration of the first hydraulic pressure chamber Kma and the configuration of the second hydraulic pressure chamber Kmb are basically the same.

The first and second pistons PNA and PNB are pressed against the output rod RDO by two elastic members (for example, compression springs) PSA and PSB. For example, the second piston spring PSB is provided in a compressed manner between a bottom of the inner cylinder of the master cylinder MC and the second piston PNB, and the first piston spring PSA is provided in a compressed manner between the second piston PNB and the first piston PNA. The output rod. RDO and the first piston PNA can be separated from each other, but they are moved in unison because they are pressed against the output rod RDO by the first and second piston springs PSA and PSB.

When the braking operation member BP is operated, the input rod RDI is moved in the forward direction Hff As the input rod RDI advances, the output rod RDO moves in the forward direction Hfp, and the first and second pistons PNA and PNB are urged by the output rod RDO. When the first and second pistons PNA and PNB are moved in the forward direction Hfp, first, the fluid path to the reservoir RSV is blocked by the first and second pistons PNA and PNB.

Further, when the first and second pistons PNA and PNB are advanced, the volumes of the first and second hydraulic pressure chambers Kma and Kmb are decreased, thereby increasing first and second hydraulic pressures Pma and Pmb of the master cylinder MC. Here, the first hydraulic pressure Pma and the second hydraulic pressure Pmb are at the same pressure. The first and second hydraulic pressures Pma and Pmb are transmitted to the four wheel cylinders WC through the fluid path HK to increase the hydraulic pressures Pwa in the wheel cylinders WC.

When the braking operation member BP is returned to an initial position (position corresponding to one at non-braking), the input rod RDI is moved in the rearward direction Hrf. As the input rod RDI is retracted, the output rod RDO is moved in the retracted direction Hrp, and the first and second pistons FNA and PNB are pushed in the retracted direction Hrp by the first and second piston springs PSA and PSB.

Therefore, the first and second pistons and PNB are retracted, and the volumes of the first and second hydraulic pressure chambers Kma and Kmb are increased. As a result, the brake fluid returns to the master cylinder MC, and the hydraulic pressures Pma and Pmb are decreased. As a result, the hydraulic pressure Pwa in the four wheel cylinders WC is decreased.

The first and second hydraulic pressure sensors PMA and PMB are provided so as to detect the hydraulic pressures Pma and Pmb (the hydraulic pressure Pwa in the wheel cylinder WC, as a result) of the first and second hydraulic pressure chambers Kma and Kmb. The first and second hydraulic pressures Pma and Pmb are input to the electronic control unit ECU. The first hydraulic pressure Pma and the second hydraulic pressure Pmb have the same value. Therefore, one of the first hydraulic pressure sensor PMA and the second hydraulic pressure sensor PMB may be omitted.

<Braking Actuator BAC>

Figure 2:
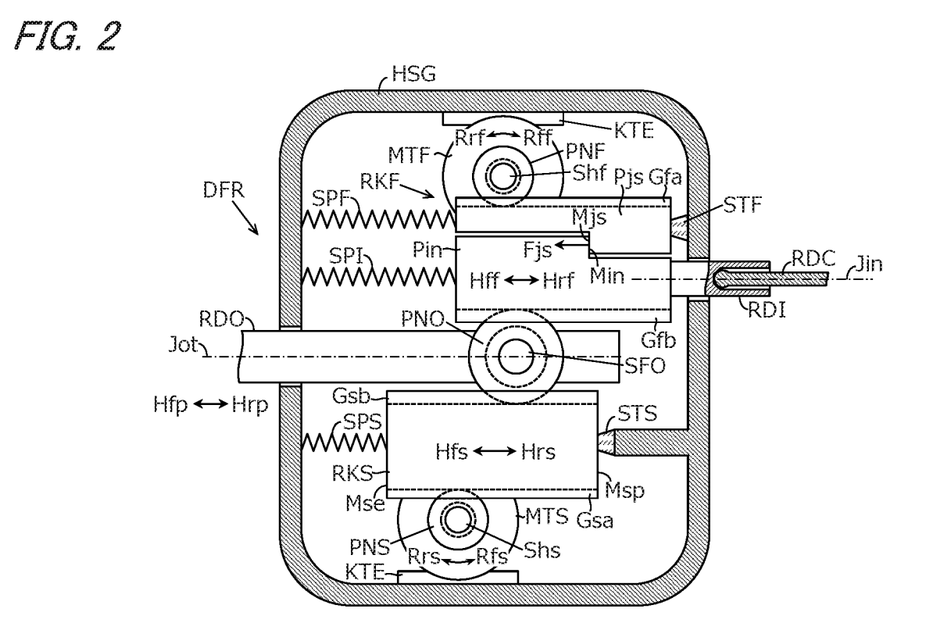
FIG. 2 is a schematic view for explaining a structural example of a braking actuator BAC.

With reference to the schematic diagram of FIG. 2, the braking actuator BAC (In particular, the differential mechanism DFR) will be described. As described above, the actuator BAC is configured to include the first electric motor MTF, the second electric motor MTS, the input rod RDI, the output rod RDO, and the differential mechanism DFR.

In the braking actuator BAC, since the differential mechanism DFR is employed, the operation force Fbp and the operation displacement Sbp are separated and controlled separately by the first and second electric motors MTF and MTS. Therefore, the hydraulic characteristic CHpm and the operational characteristic CHbp which will be described later can be controlled in an independent manner.

The differential mechanism DFR of the braking actuator BAC is formed by a rack and pinion mechanism (a conversion mechanism between rotational and linear motions). In the rack and pinion mechanism, "circular gear referred to as pinion gear" and "rack consisting of a flat rod with teeth (rack gear) that engage the pinion gear" are combined.

The differential mechanism DFR is configured to include "first and second pinion gears PNF, PNS", "first and second racks RKF, RKS", "input, output rod RDI, RDO", and an output pinion gear PNO. Here, the "first and second pinion gears PNF, PNS", the "first and second racks RKF, RKS", and the output pinion gear PNO correspond to "transmission mechanism" for transmitting the output (power) of the "first and second electric motors MTF and MTS".

The differential mechanism DFR is made up of three power transmission mechanisms (which are also referred to simply as "transmission mechanisms"). "The first transmission mechanism" transmits the output of the first electric motor MTF to the input rod RDI. Details will be described below A combination (rack and pinion mechanism) of the first pinion gear PNF and the first input rack gear portion Gfa of the first rack RKF described below corresponds to the first transmission mechanism. The "second transmission mechanism" transmits the output of the second electric motor MTS to the output rod PDO. A combination of the second pinion gear PNS and the second input rack gear portion Gsa of the second rack RKS and a combination of the output pinion PNO and the second output rack gear portion Gsb of the second rack RKS correspond to the second transmission mechanism. The "third transmission mechanism" transmits the output of the input rod RDI to the output rod RDO. A combination of the output pinion gear PNO and the first output rack gear portion Gfb of the second rack RKF corresponds to the third transmission mechanism. The differential mechanism DFR adjusts the relative movement between the input rod RDI and the output rod RDO.

The first and second electric motors MTF and MTS are fixed inside the housing HSG by the fixing members KTE. The first pinion gear PNF is fixed to the output shaft portion Shf of the first electric motor MTF. Similarly, the second pinion gear PNS is fixed to the output shaft portion Shs of the second electric motor MTS. A speed reducer may be provided at least one of between the rotating shaft (first rotating shaft) Shf of the first electric motor MTF and the first pinion gear PNF, and between the rotating shaft (Second axis of rotation) Shs of the second electric motor MTS and the second pinion gear PNS.

A connecting rod RDC is connected in a pivotal manner to the braking operation member BP by a clevis (U-shape link). In the connecting rod RDC, the opposite side of the clevis portion is machined into a spherical shape and is mechanically connected to the input rod RDI. Although the braking operation member BP pivots at the mounting portion of the vehicle body BD the pivotal movement of the braking operation member BP is efficiently converted to the linear movement of the input rod RDI by the connecting rod RDC.

The first rack RKF is smoothly movable with respect to the housing HSG along the input axis Jin (central axis of the input rod RDI). The first rack RKF is made up of two members, an input portion Pin and an assist portion Pjs. The input portion Pin and the support portion Pjs are formed to be mutually displaceable along the input axis line Jin. The input rod RDI is fixed to the input portion Pin, and a first output rack gear Gfb is formed, and the first output rack gear Gfb is meshed with an output pinion gear PNO. A first input rack gear Gfa is formed in the support portion Pjs separately from the first output rack gear Gfb, and the first input rack gear Gfa is meshed with the first pinion gear PNF. Therefore, the rotational power of the first electric motor MTF as input to the assist portion Pjs via the first pinion gear PNF. It is to be noted that in the first rack RKF, the first output rack gear Gfb is located on the opposite side of the input axis Jin of the first input rack gear Gfa.

The input rod RDI is fixed to the input portion Pin of the first rack RKF. The output of the first electric motor MTF is converted from rotational motion to translational motion through the first power transmission mechanism (the first pinion gear PNF and the input rack gear Gfa of the first rack RKF) and transmitted to the input rod RDI. The output of the input rod RDI is transmitted to the output rod RDO via the third power transmission mechanism (the output rack gear Gib of the first rack RKF and output pinion gear PNO).

The input portion Pin is provided with a step perpendicular to the input axis line Jin, and a pressure receiving surface Min is formed which is directed in the rearward direction Hrf. Similarly, a step perpendicular to the input axis line Jin is provided in the assist portion Pjs, and an assist surface Mjs is formed which is directed in the forward direction Hff. Then, the force Fjs in the forward direction Hff is applied by the surface contact between the assisting surface Mjs and the pressure receiving surface Min. Here, the force Fjs acting from the assist portion Pjs on the input unit Pin is called "supporting force". The supporting force Fjs generated by the first electric motor MTF is transmitted to the forward direction Hff but not to the backward direction Hrf (direction opposite to the forward direction Hff) due to the configuration of the input portion Pin and the supporting force Pjs.

The housing HSG is provided with a first stopper STF so as to prevent the first rack RKF from moving in the rearward direction Hrf. The assisting portion Pjs of the first rack RKF is pressed in the rearward direction Hrf by the first rack elastic body SPF (for example, a compression spring). When the first rack elastic body SPF is provided between the housing HSG and the supporting portion Pjs and the first electric motor MTF is not energized, the supporting portion is pressed against the first stopper STE Similarly, the input pin of the first rack RKF is pressed in the rearward direction Hrf by the return elastic body SPI (for example, a compression spring). A return elastic body SPI is provided between the housing HSG and the input portion Pin, and the input portion Pin and the support portion Pjs are moved as one unit.

Like the first rack RKF, two rack gears Gsa and Gsb are formed in the second rack RKS. The output pinion gear PNO meshes with the first output rack gear Gfb of the first rack RKF and also meshes with the second output rack gear Gsb of the second rack RKS. In the second rack RKS, a second input rack gear Gsa is formed on the rear side of the second output rack gear Gsb, in addition to the second output rack gear Gsb. The second input rack gear Gsa is meshed with the second pinion gear PNS. Therefore, the output of the second electric motor MTS is converted from rotational motion to translational motion and transmitted to the output rod PDO via the second power transmission mechanism (the second pinion gear PNS, the rack gears Gsa and Gsb of the second pinion gear PNS of the second rack RKS, and the output pinion gear PNO).

The housing HSG is provided with a second stopper STS to prevent the second rack RKS from moving in the forward direction Hfs. The second rack RKS is pressed in the rearward direction Hrs by the second rack elastic member SPS (for example, a compression spring). When the braking operation member BP is not operated (i.e., in the case of "Bpa=0"), the second rack RKS is pressed against the second stopper STS to be in contact therewith by the second rack elastic member SPS. This position is an initial position of the second rack RKS corresponding to a state in which the braking operation member BP is not conducted.

The output pinion gear PNO is fixed to the output rod RDO in a rotatable manner by the rotating shaft SFO. The output rod RDO is smoothly movable with respect to the housing HSG along the output axis Jot. The first and second racks RKF and RKS, and output rod RDO are allowed to move smoothly relative to the housing HSG along the central axis Jin (center axis Jot).

Next, an operation of the brake actuator BAC will be described. As described above, in the movement of each component, the movements in the "forward directions Hff, Hfs, and Hfp" correspond to an increase in the master cylinder hydraulic pressure Pma. The linear movement in the forward direction corresponds to the rotational motion of the "normal directions Rff and Rfs" of the first and second electric motors MTF and MTS. Also, the movement of "backward directions Hrf, Hrs, and Hrp" in the direction opposite to the forward directions Hff, Hfs, and Hfp corresponds to a decrease in the master cylinder pressure Pma. The linear movement in the rearward direction corresponds to the rotational movement of the "reverse directions Rrf and Rrs" of the first and second electric motors MTF and MTS.

When the braking operation amount Bpa is increased and the input rod RDI is moved in the forward direction Hff, the first electric motor MTF is driven in the forward direction Rff. The rotational power of the first electric motor MTF is transmitted to the assist portion Pjs of the first rack RKF via the first pinion gear PNF. Since the power from the assist portion Pjs to the input portion Pin is transmitted to the forward direction Hff, the assist portion Pjs presses the input portion Pin to the forward direction Hff.

The assist force Fjs is generated when the output of the first electric motor MTF is transmitted to the input rod RDI by a transmission mechanism (first pinion gear PNF and first rack RKF). The assist force Fjs assists the operation of the braking operation member BP by the driver and reduces the operation force Fbp of the braking operation member BP. That is, the operating force Fbp can be adjusted by the first electric motor MTF, the first pinion gear PNF, and the first rack RKF to achieve a boost function.

The movement of the input rod RDI in the forward direction Hff is transmitted to the output rod RDO via, the input portion Pin of the first rack RKF and the output pinion gear PNO. As a result, the output rod RDO is also moved in the forward direction Hfp, but the movement (displacement Sro) of the output rod RDO depends on the movement (displacement) of the second rack RKS driven by the second electric motor MTS.

For example, when the second electric motor MTS is driven in the forward direction Rfs, the second rack RKS is moved in the forward direction Hfs, so that the displacement Sro of the output rod RDO is increased as compared with the case where the second electric motor MTS is stopped. Therefore, the degree of generation of the hydraulic pressure Pma with respect to the operation displacement Sbp is increased. On the other hand, when the second electric motor MTS is driven in the reverse rotation direction Rrs, the second rack RKS is moved in the reverse direction Hrs, so that the displacement Sro of the output rod RDO is reduced in comparison with the case where the second electric motor MTS is stopped. As a result, the hydraulic pressure Pma is less likely to occur with respect to the increase in the operation displacement Sbp.

When the braking operation member BP is returned and the input rod RDI is moved in the rearward direction Hrf, the first and second electric motors MTF and MTS are rotated in the reverse directions Rrf and Rrs. The first rack RKF is pressed in the rearward direction Hrf by the elastic members (compression springs) SPF and SPI. In addition, the second rack RKS is pressed in the rearward direction Hrs by the elastic body (compression spring) SPS. The first and second racks RKF and RKS are brought into contact with the stoppers STF and STS, and the input and output rods RDI and RDO are returned to the initial positions corresponding to the "Bpa=0".

<Independent Adjustment of Hydraulic Characteristic CHpm and Operating Characteristic CHbp in Variable Characteristic Control>

Figure 3:
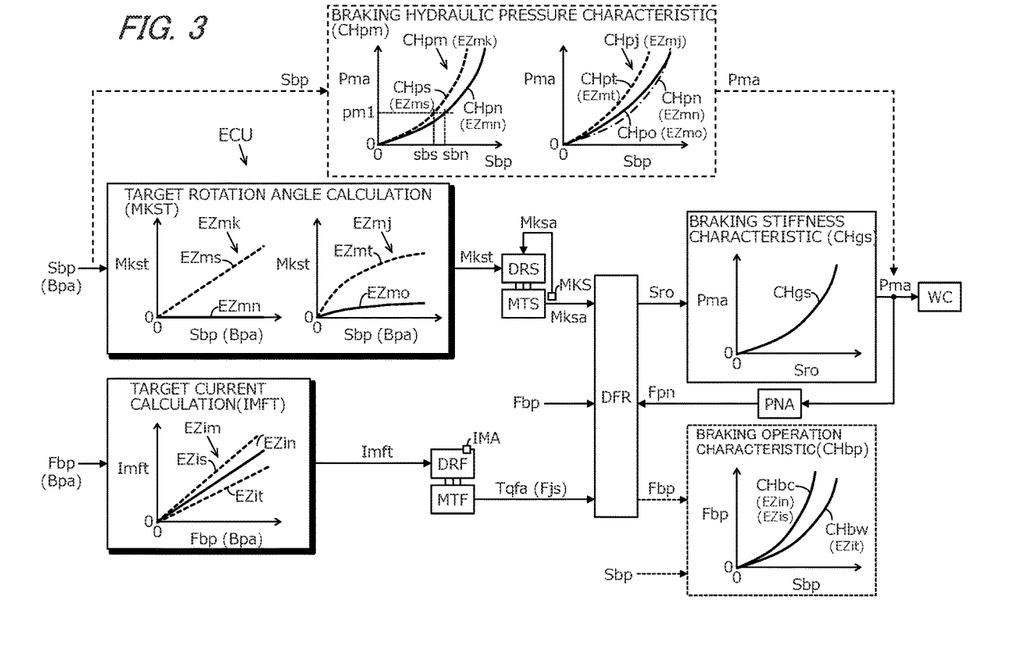
FIG. 3 is a block diagram for explaining independent adjustment of characteristics in a characteristic variable control.

With reference to the block diagram of FIG. 3, the correlation between the hydraulic characteristic CHpm and the operating characteristic CHbp and an independent adjustment of the relationship will be described. Adjustments of the hydraulic characteristic CHpm and the operating characteristic CHbp are referred to as "variable characteristic control". The characteristic variable control is executed based on an instruction (for example, the selection of characteristics by the switch MSW) from the driver. Alternatively, the variable characteristic control can be automatically adjusted based on the running state of the vehicle (for example, the traveling speed of the vehicle) and the running environment of the vehicle (for example, road surface friction coefficient). It is to be noted that in FIG. 3, blocks IMFT and MKST indicated with shadow are for controlling the first and second electric motors MTF and MTS. Then, as a result of the control of the first and second electric motors MTF and MTS, the braking characteristics CHbp and CHpm indicated by broken line blocks are determined.

In a common vehicle, the relationship between hydraulic characteristic CHpm and operating characteristic CHbp is interdependent. More specifically, in the region where the operation displacement Sbp is small, the increase in the hydraulic pressure Pma is relatively small with the increase in the operation displacement Sbp. On the other hand, in the region where the operation displacement Sbp is large, the increase in the hydraulic pressure Pma is relatively large with the increase in the operation displacement Sbp. This feature is referred to as "stiffness characteristic CHgs" because of the rigidities (spring constant of the friction member, caliper CP, fluid path HK, etc.) of the braking device. Since the operating force Fbp is generated by the hydraulic pressure Pma, in a common braking device, the operating displacement Sbp, the operating force Fbp, and the hydraulic pressure Pma have a mutual relationship.

In the actuator BAC, controlling the first electric motor MTF and the second electric motor MTS through the differential mechanism DFR makes it possible to adjust independently the hydraulic characteristic CHpm and the operating characteristic CHbp without depending on each other. The assist force Fjs is controlled by the first electric motor MTF, and the operating characteristic CHbp is adjusted. In addition, the second electric motor MTS controls an output displacement Sro to adjust the hydraulic pressure characteristic CHpm.

In a target rotation angle calculation block MKST, a target rotation angle Mkst is calculated based on the operation displacement Sbp and the displacement map EZmk. The displacement map EZmk is a calculation map for adjusting the hydraulic characteristic CHpm (relationship between hydraulic pressure Pma and operating displacement Sbp). The displacement map EZmk is made up of a reference displacement map EZmn and a short displacement map EZms. The target rotation angle Mkst is a target value of the rotation angle of the second electric motor MTS for controlling the second electric motor MTS. As a result of the target rotation angle Mkst, the output displacement Sro is adjusted. In other words, the displacement map EZmk is a calculation map for determining the output displacement Sro with respect to the operation displacement Sbp, and the output displacement Sro is controlled by the second electric motor MTS based on the displacement map EZmk.

When the normal mode nmd is designated by the designation switch MSW, the reference displacement map EZmn is employed as the displacement map EZmk. In the reference displacement map EZmn, even if the operation displacement Sbp increases, the target rotation angle Mkst is calculated as "0". That is, in the "Msw=nmd", the second electric motor MTS is not rotated and the second rack RKS is held so as not to be moved.

When the sport mode smd is designated by the designation switch MSW, the short displacement map EZms is employed as the displacement map EZmk. In the short displacement map EZms, the target rotation angle Mkst is calculated to increase from "0" as the operation displacement Sbp increases. That is, in the short displacement map EZms, the target rotation angle Mkst is calculated to be larger than the reference displacement map EZmn. Therefore, in the "Msw=smd", an amount corresponding to the target rotation angle Mkst is added to the operation displacement Sbp to increase the output displacement Sro.

In the target rotation angle calculation block MKST, a linear displacement map EZmj (Operation map EZmo, EZmt) is employed in place of the displacement map EZmk (Arithmetic map EZm, EZms). As described above, the stiffness characteristic CHgs has a nonlinear characteristic of "Convex Down". The linear displacement map EZmj is set to compensate for nonlinearity. More specifically, the linear reference map EZmo is set for the normal mode nmd to correspond to the reference displacement map EZmn (Mkst=0). In the linear reference map EZmo, as the operation displacement Sbp increases, the target rotation angle Mkst increases with a characteristic of "Convex Up". Similarly, also in the linear short displacement map EZmt, as the operation displacement Sbp increases, the target rotation angle Mkst increases with a characteristic of "Convex Up". The linear short displacement map EZmt is larger than the linear reference map EZmo at the target rotation angle Mkst. In other words, in the linear short displacement map EZmt, the target rotation angle Mkst is calculated to be larger than in the linear reference map EZmo.

The target rotation angle Mkst is transmitted from the target rotation angle calculation block MKST to the second drive circuit DRS of the controller ECU. In the drive circuit DRS, the rotation angle feedback control is executed based on the target rotation angle Mkst and the actual rotation angle Mksa detected by the rotation angle sensor MKS. A rotation angle feedback control controls the second electric motor MTS so that the actual rotation angle Mksa comes to be in coincidence with the target rotation angle Mkst. The actual rotation angle Mksa, which is the control result, is input to the differential mechanism DFR.

In the target current calculation block IMFT, the target current Imft is calculated based on the operation force Fbp and the assistant map EZim. The assistant map EZim is a calculation map for adjusting the operation characteristic CHbp (relationship between the operation force Fbp and the operation displacement Sbp). The assistant map EZim is composed of a reference assistant map EZin and an assist increase map EZis (alternatively, the assist reduction map EZit). The target current Imft is a target value of the current of the first electric motor MT for controlling the first electric motor MTF. The electric motor outputs a torque generally proportional to the current. In order to adjust the assist force Fjs, the output torque of the first electric motor MTF is adjusted based on the target current Imft. In other words, the assist force map EZim is a calculation map for determining the assist force Fjs with respect to the operation force Fbp, and the assist force Fjs is controlled by the first electric motor MTF based on the assist force map.

When the designation switch MSW designates the normal mode nmd, the reference assistant map EZin is adopted as the assistant map EZim. In the reference assistant map EZim, the target current Imft is calculated to increase from "0" according to the increase of the operation force Fbp.

When the sport mode smd is instructed by the signal Msw from the instruction switch MSW, the assist increase map (Also called "first assistant map") EZis is employed as the assistant map EZim. In the assist increase map EZis, the target current Imft is calculated to increase from "0" as the operation force Fbp increases with a characteristic larger than the reference assistant map EZin. That is, the increase gradient (slopet) of the target current Imft with respect to the increase of the operating force Fbp is larger in the case of the assist increase map EZis than in the case of the reference assistant map EZin. For example, in the reference assistant map EZin and the assist increase map EZis, the operation characteristic CHbp, which is the relationship between the operation displacement Sbp and the operation force Fbp, is set so as to be maintained at an approximately constant.

In the target current operation block IMFT, a boost reduction map (which is also called "second assistant map") EZit is employed in place of the boost increase map EZis. In the assist reduction map EZit, the target current Imft is calculated to increase from "0" as the operation force Fbp increases with a characteristic smaller than the reference assistant map EZin. That is, the slope of the increase of the target current Imft with respect to the increase of the operation force Fbp is smaller in the case of the assist reduction map EZit than in the case of the reference assistant map EZin. For example, in the reference assistant map EZin and the assist reduction map EZit, the work amount Wbp of the braking operation member BP can be set to be substantially constant. Here, the work amount Wbp is a value obtained by multiplying the operation displacement Sbp by the operation force Fbp. Whether the first, second assistant map EZis or EZit is selected will be described later.

The target current Imft is transmitted from the target current calculation block IMFT to the first drive circuit DRF of the controller ECU. In the drive circuit DRF, current feedback control is executed based on the target current Imft and the actual current Imfa detected by the current sensor IMA. The output torque Tqfa (As a result, the assist force Fjs) of the first electric motor MTF is controlled by the current feedback control so that the actual current Imfa coincides with the target current Imft. The torque Tqfa as the control result is input to the differential mechanism DFR as the assist force Fjs.

The differential mechanism DFR outputs an output displacement Sro. As the output displacement Sro increases, the hydraulic pressure Pma changes with the characteristic (rigidity characteristic) CHgs of "Convex Down". The hydraulic pressure Pma is applied to the wheel cylinders WC through the fluid paths HK. The hydraulic pressure Pma acts on the differential mechanism DFR as the reaction force Fpn of the piston PNA. The rigidity characteristic CHgs is based on the rigidities of the friction member, the caliper CP, the fluid path HK, and the like.

<Choosing Assistance Map for Sport Mode smd>>

A description will be given as to which operation characteristic is selected among the assist increase map EZis and the assist reduction map EZit. When the assist increase map EZis is employed as the operation map EZim, the assist force Fjs of the sport mode smd is larger than the assist force Fjs of the normal mode nmd. On the other hand, when the assist reduction map EZit is employed as the operation map EZim, the assist force Fjs of the sport mode smd is smaller than the assist force Fjs of the normal mode nmd. The selection of the calculation maps EZis and EZit depends on the vehicle specifications and characteristics which include the specifications of the braking device.

The piston reaction force Fpn is proportional to the sum of the operating force Fbp and the assist force Fjs. When the hydraulic pressure characteristic CHpm is switched from the standard hydraulic pressure characteristic CHpn to the short displacement characteristic CHps, the reaction force Fpn of the piston PNA increases. When the power factor ratio Bst, which is the ratio of the piston reaction force Fpn to the operating force Fbp, is used, a relationship of "Bst=Fpn/Fbp=(Fbp+Fjs)/Fbp" is established.

In a vehicle having a relatively small power factor ratio ratio Bst, the component of the operating force Fbp is large in a burden ratio of the piston reaction force Fpn. Therefore, the driver may feel "The operation became heavy." due to the increase in the piston reaction force Fpn. In this situation, an assist increase map (first assistant map) EZis is employed. For example, the boost increase map EZis may be set such that the operating characteristic CHbp is approximately constant regardless of the selected hydraulic characteristic CHpm (constant operating force characteristic CHbc). The assist increase map EZis makes it possible to eliminate driver discrepancies due to the operation being heavy.

On the other hand, in a vehicle having a relatively large power factor ratio Bst, the contribution of the operating force Fbp to the burden of the piston reaction force Fpn is small. Therefore, even if the piston reaction force Fpn is increased, the driver does not feel a change in the operating force Fbp. In this case, the user may feel (i.e., the operation displacement Sbp is shortened.) "The operation became sensitive" by changing the hydraulic pressure characteristic CHpm. In this situation, the assist reduction map (second assistant map) EZit is employed. For example, the assist reduction map EZit can be set so that the work amount Wbp (=Sbp×Fbp) of the operating member BP becomes approximately constant regardless of the characteristics of the hydraulic pressure characteristic CHpm (constant work characteristic CHbw). The assist reduction map EZit may eliminate driver discrepancies due to operational sensitivity.

The selection of the operation maps EZis and EZit has been described with reference to the power factor ratio Bst. However, how the driver feels also depends on the characteristics of the vehicle as a whole (vehicle attitude, how deceleration occurs, etc.). Therefore, which characteristic is selected is determined based on the running experiment of the vehicle, and the details of the characteristic are set based on the adaptation (tuning).

<<Hydraulic Characteristic CHpm and Operating characteristic CHbp>>

The hydraulic pressure characteristic CHpm and the operating characteristic CHbp will be described. The piston reaction force Fpn caused by the assist force Fjs (output torque Tqfa of the first electric motor MTF), the operation displacement Sbp, and the hydraulic pressure Pma act on the differential mechanism DFR as a force. In order to balance these forces, the operation displacement Sbp, the output displacement Sro, and the actual rotation angle Mksa are determined. The actual rotation angle Mksa is controlled to match the target rotation angle Mkst by the second electric motor MTS. The hydraulic characteristic CHpm and the operating characteristic CHhp are characteristics resulting from the operation of the braking operation member BP and the control of the two electric motors MT.

First of all, the hydraulic pressure characteristic CHpm will be described. The hydraulic pressure characteristic CHpm is a characteristic (Sbp vs. Pma characteristic) of the hydraulic pressures Pma and Pmb with respect to the operation displacement Sbp. The hydraulic pressure characteristic CHpm is adjusted by the displacement map EZmk (or EZmj).

Under the normal mode mnd, the reference characteristic CHpn is set for corresponding to the reference displacement map EZmn. Under the sport mode smd, the short displacement characteristic CHps is achieved by the short displacement map EZms. For example, in order to generate a value pm 1 as the hydraulic pressure Pma, the reference characteristic CHbn requires an operational displacement Sbp of the value sbn. As the displacement map EZmk is changed from the reference displacement map EZmn to the short displacement map EZms, the hydraulic characteristic CHpm is changed from the reference characteristic CHpn to the short displacement characteristic CHps. With this change, the operational displacement Sbp is reduced from the value sbn to the value sbs.

That is, the operation displacement Sbp is shortened by the short displacement characteristic CHps based on the short displacement map EZms. The short-displacement characteristic CHps can improve the rigidity feeling of the braking operation member BP according to the preference of the driver.

The standard hydraulic characteristic CHpn has a nonlinear characteristic of "Convex Down" due to the rigidity characteristic CHgs. The linear reference map EZmo compensates for the nonlinearity (i.e., linearized) and achieves the linear reference characteristic CHpo under the normal mode nmd. Furthermore, under the sport mode smd, the linear short displacement map EZmt can shorten the operational displacement Sbp and achieve a linear short displacement characteristic CHpt. The linear displacement map EZmj changes the hydraulic characteristic CHpm to the linear hydraulic characteristic CHpj. The linear short displacement characteristic CHpt can improve the responsive rigidity feeling and the linear response feeling of the braking operation member BP according to the preference of the driver.

Next, the operation characteristic CHbp will be described. The operation characteristic CHbp is a characteristic (Sbp vs Fbp characteristic) of the operation force Fbp with respect to the operation displacement Sbp. The operating characteristic CHhp is adjusted by the assistant map EZim. When the operation displacement Sbp is shortened in the hydraulic pressure characteristic CHpm, a larger operation force Fbp is required. The operating characteristic CHbp is modified in accordance with a change in the operating force Fbp.

Corresponding to the reference displacement map EZmn (alternatively, a linear criteria map EZmo), the reference assistant map EZin is employed in the normal mode nmd. Under the sport mode smd, the assist increase map EZis is employed in correspondence with the short displacement map EZms (alternatively, the linear short displacement map EZmt). With the change of the hydraulic pressure characteristic CHpm, the assistant map EZim is changed from the reference assistant map EZin to the assist increase map EZis (Modify), and the assist force Fjs is increased. Therefore, the operating characteristic CHbp is always maintained to be approximately at constant as indicated by the operating characteristic CHbc (constant operating force characteristic). As a result, the driver's discrepancy caused by the increase in the operating force Fbp can be eliminated.

In some vehicles, the increase in the operating force Fbp due to the change in the hydraulic pressure characteristic CHpm is not so problematic. However, the shortening of the operation displacement Sbp may cause a case where the operation displacement Sbp is felt to be sensitive in a sudden operation. In such a vehicle, the assist reduction map EZit is employed as the assistant map (operation map) EZim under the sport mode smd in place of the assist increase map EZis. When the operation displacement Sbp is shortened by the assist force reduction map EZit, the assist force Fjs is reduced. As a result, the operating force Fbp is changed to a heavy value as indicated by the operating characteristic CHbp. For example, in the operation characteristic CHbw (constant work characteristic), the work amount Wbp (=Sbp/Fbp) of the braking operation member BP is approximately constant. By the operation characteristic CHbw using the work amount as an index, the sensitivity in operation feeling of the braking operation member BP can be suppressed.

In the above description, the target rotation angle Mkst is determined based on the operation displacement Sbp, and the target current Imft is determined based on the operation force Fbp. However, the specifications of the actuator BAC (gear ratio, pitch, etc.) are known and the outputs of the two electric motors MTs are also known because they are under control. Therefore, the operational displacement Sbp and the operational force Fbp can be converted between each other. Therefore, the target rotation angle Mkst can be calculated based on the operation force Fbp. The target current Imft can be calculated based on the operation displacement Sbp. In other words, the target rotation angle Mkst and the target current Imft are calculated based on the operation amount Bpa (general term for operational displacement Sbp and operational force Fbp).

<Processing of Variable Characteristic Control>

Figure 4:
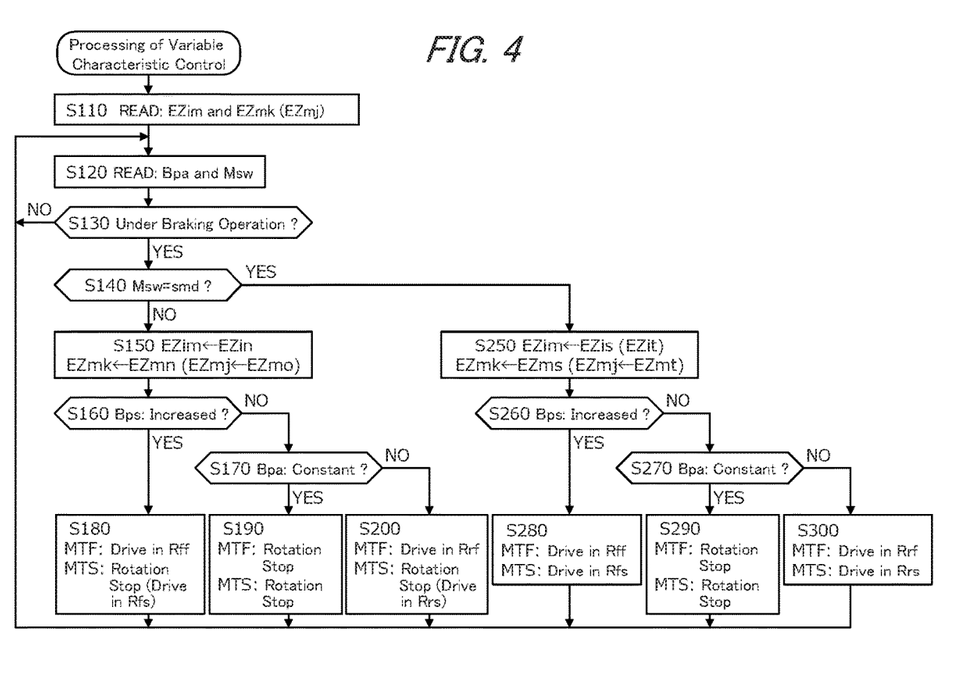
FIG. 4 is a control flow chart for explaining a process of the characteristic variable control.

With reference to the control flow chart of FIG. 4, driving examples of the first and second electric motors MTF and MTS in the variable characteristic control will be described. In particular, here, the variable characteristic control is executed based on the signal (indicator signal) Msw from the instruction switch MSW operated by the driver. As described above, in the movement of each component of the actuator BAC, the movement of the "forward Hff, Hfs, and Hfp" corresponds to an increase in the hydraulic pressures Pma and Pmb in the master cylinder MC. The linear motion in the forward direction corresponds to the rotational motion of the "normal directions Rff and Rfs" of the first and second electric motors MTF and MTS. The movement of "backward directions Hrf, Hrs, and Hrp" in the direction opposite to the forward directions Hff, Hfs, and Hfp correspond to a decrease in the hydraulic pressures Pma and Pmb in the master cylinder MC. The linear movement in the rearward direction corresponds to the rotational movement of the "reverse directions Rrf and Rrs" of the first and second electric motors MTF and MTS.

In step 110, the assistant map EZim and the displacement map EZmk (alternatively, a linear displacement map EZmj) are read as calculation maps. In the assistant map EZim, the reference assistant map EZin is set as an initial characteristic. In the displacement map EZmk (alternatively, linear displacement EZmj), the reference displacement map EZmn (alternatively a linear criteria map EZmo) is set as an initial characteristic.

In step 120, the braking operation amount Bpa and the instruction signal Msw are read. In step 130, "Whether or not braking operation is in progress" is determined based on the braking operation amount Bpa. For example, when the operation amount Bpa is equal to or greater than the predetermined value bpo, the result of step S130 is affirmative, and the process proceeds to step S140. On the other hand, if "Bpa<bpo", step 130 is negated, and the process returns to step S120.

In step 140, "Whether or not the sport mode said is in active" is determined based on the instruction signal Msw. If the instruction signal Msw indicates the sport mode smd and the determination in step 140 is affirmative (For "YES"), the process proceeds to step 250. On the other hand, when the instruction signal Msw instructs the normal mode nmd and the result of step 140 is negative (For "NO"), the process proceeds to step S150.

The processing of the normal mode nmd will be described below. In step 150, the reference assistant map EZin is set as the assistant map EZim, and the reference displacement map EZmn is set as the displacement map EZmk. When linearization of the hydraulic characteristic CHpm is required (when linear hydraulic characteristics CHpj are required), the linear displacement map EZmj is employed instead of the displacement map EZmk, and the linear reference map EZmo is set.

In step S160, "Whether or not the operation amount Bpa is increasing" is determined based on the operation amount Bpa. If the operation amount Bpa is increasing and step S160 is affirmative (For "YES"), the process proceeds to step S180. On the other hand, if step S160 is negative (For "NO"), the process proceeds to step S170.

In step S170, "Whether or not the operation amount Bpa is constant" is determined based on the braking operation amount Bpa. If the braking operation member BP is held and the determination in step S170 is affirmative (For "YES"), the process proceeds to step 3190. On the other hand, if the operation amount Bpa is decreasing and the determination in step S170 is negative (For "NO"), the process proceeds to step 200.

In step S180, the first electric motor MTF is driven in the normal rotation direction Rff, and the second electric motor MTS is stopped. In step S190, the rotation of the first electric motor MTF and the second electric motor MTS are stopped. In step 200, the first electric motor MTF is driven in the reverse rotation direction Rrf, and the second electric motor MTS remains stopped.

When the instruction signal Msw is under the normal mode nmd and the reference displacement map EZmn is employed, the second electric motor MTS is stopped and the output displacement Sro is not adjusted with respect to the operation displacement Sbp. At this time, the first electric motor MTF is controlled based on the reference assistant map EZin so as to generate the assist force Fjs and reduce the operation displacement Sbp. If the linear reference map EZmo is employed, the second electric motor MTS is driven in the forward rotation direction Rfs in step S180 and driven in the reverse rotation direction Rrs in step S200.

Next, the processing under the sport mode smd will be described. In step S250, the assist increase map EZis (alternatively, the assist decrease map EZit may be used) is set as the assistant map EZim, and the short displacement map EZms is set as the displacement map EZmk. When linearization of the hydraulic pressure characteristic CHpn is required, the linear displacement map EZmj is employed instead of the displacement map EZmk, and the linear short displacement map EZmt is set.

In step S260, "Whether or not the operation amount Bpa is increasing" is determined based on the operation amount Bpa. If the operation amount Bpa is increasing and step S260 is affirmative (For "YES"), the process proceeds to step S280. On the other hand, if step S260 is negative (For "NO"), the process proceeds to step S270.

In step 3270, "Whether or not the operation amount Bpa is constant" is determined based on the braking operation amount Bpa. If the braking operation member BP is held and step S270 is affirmative (For "YES"), the process proceeds to step S290. On the other hand, if the operation amount Bpa is decreasing and step S270 is negative (For "NO"), the process proceeds to step S300.

In step S280, the first electric motor MTF is driven in the forward rotation direction Rff, and the second electric motor MTS is driven in the forward rotation direction Rfs. In step S290, the rotations of the first electric motor MTF and the second electric motor MTS are stopped. In step S300, the first electric motor MTF is driven in the reverse rotation direction Rrf, and the second electric motor MTS is driven in the reverse rotation direction Rrs.

When the instruction signal Msw is under the sport mode stud and the reference displacement map EZmn is employed, the second electric motor MTS is adjusted by increasing the output displacement Sro with respect to the operation displacement Sbp based on the short displacement map EZms (alternatively, the linear short displacement map EZmt). That is, the operation displacement Sbp is shortened by moving the second rack RKS in the forward direction Hfs. At this time, the first electric motor MTF is controlled based on the assist increase map EZis or assist decrease map EZit so as to generate the assist force Fjs and reduce the operation displacement Sbp. The assisting force Fjs is determined to be larger in the assisting increase map EZis than in the case of the assisting decrease map EZit.

As described above, by adjusting the outputs of the two electric motors MTF and MTS, the force Fbp (i.e., the operation force Fbp of the braking operation member BP) acting on the input rod RDI and the displacement Sro (i.e., the operation displacement Sbp of the braking operation member BP) of the output rod RDO are independently controlled. More specifically, the first electric motor MTF is controlled based on the assistant map EZim for calculating the assist force Fjs with respect to the operation amount Bpa. The second electric motor MTS is controlled based on the displacement map EZmk (or EZmj) for calculating the output displacement Sro with respect to the manipulated variable Bpa. When the displacement map EZmk (or EZmj) is changed, the assistant map EZim is also modified. Therefore, the change in the operating force Fbp can be suitably adjusted, and the deviation of the driver due to the change in the hydraulic characteristic CHpm and the operating characteristic CHbp can be reduced.

<Independent Adjustments of Hydraulic Characteristic CHpm and Operating Characteristic CHbp in Regenerative Cooperative Control>

In the above embodiment, the characteristic variable control in which the operation displacement Sbp is shortened has been described as the variable control in the hydraulic characteristic CHpm and the operation characteristic CHbp. Alternatively or additionally, regenerative cooperative control may be performed. Here, "regenerative cooperative control" is a control of frictional braking by a brake fluid pressure in cooperation with regenerative braking by a driving electric motor. An embodiment of the regenerative cooperative control will be described with reference to the block diagram of FIG. 5.

Figure 5:
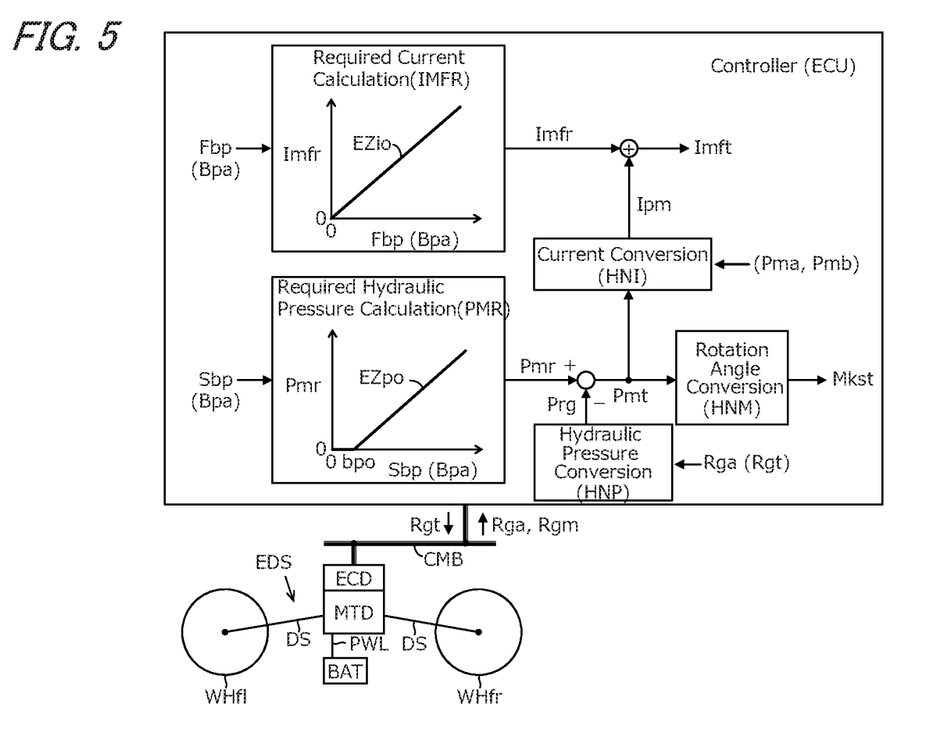
FIG. 5 is a block diagram for explaining an embodiment of a regenerative cooperative control.

The vehicle is provided with an electric drive device EDS. That is, the vehicle is an electric vehicle or a hybrid vehicle. The electric drive device EDS is made up of a drive electric motor MTD and a drive electronic control unit ECD. For example, the front wheels WHfr and WHfl of the vehicle are provided with a driving electric motor MTD via a drive shaft DS. The vehicle is so-called front-wheel drive. The driving motor MTD may be provided for the rear wheels WHrr, WHrl (rear or four-wheel drive).

When the vehicle is accelerated, a driving electric motor (which is also referred to simply as "drive motor") MTD functions as an electric motor and generates a driving force on the front wheels WHft and WHfl. On the other hand, when the vehicle is decelerated, the drive motor MTD functions as a generator to generate regenerative braking force for the front wheels WHfr and WHfl. At this time, the kinetic energy of the vehicle is converted into electric power by the generator (regenerative braking device) MTD and stored in an on-board secondary battery BAT. That is, the drive motor MTD functions not only as a so-called drive force generating device but also as a regenerative braking device. The regenerative braking device EDS converts the kinetic energy of the vehicle into electrical energy to obtain a regenerative braking force.

The drive electric motor MTD is controlled by the drive electronic control unit ECD. The output torque of the drive motor MTD is adjusted by the drive electronic control unit ECD according to an operation amount of an acceleration operation member (For example, an accelerator pedal) which is not, shown. At the time of braking, the regenerative braking force (actual clue) Rga is controlled by the drive electronic control unit ECD via the drive motor MTD which is also a generator based on the operation amount Bpa of the braking operation member BP. In the electronic control unit ECD, the state of charge of the battery BAT is monitored, and based on this, the maximum regenerative braking force Rgm that can be generated is calculated. The maximum regenerative braking force Rgm is transmitted from the electronic control unit ECD to the electronic control unit ECU via the communication bus CMB. In the braking electronic control unit ECU, a target value Pmt of the frictional braking force and a target value Rgt of the regenerative braking force are determined. The target value Rgt of the regenerative braking force is transmitted from the braking electronic control unit ECU to the driving electronic control unit ECD via the communication bus CMB, and the actual value Rga is controlled based on the target value Rgt by the electronic control unit ECD.

In the case where the regenerative braking force Rga is exerted by the regenerative braking device EDS, the generation of frictional braking force (braking force by hydraulic pressure Pma and Pmb) by the actuator BAC is reduced as much as possible. In the controller ECU, so-called regenerative cooperative control is executed. The controller ECU includes a required hydraulic pressure calculation block PMR, a hydraulic pressure conversion block HNP, a rotation angle conversion block HNM, a required current calculation block IMFR, and a current conversion block HNI.

In the required hydraulic pressure calculation block PMR, the required hydraulic pressure Pmr is calculated based on the operation displacement Sbp. The required hydraulic pressure Pmr is a target value of the hydraulic pressure of the master cylinder MC corresponding to the case where the regenerative braking force is "0". That is, the required hydraulic pressure Pmr is the hydraulic pressure of the master cylinder MC that is necessary when braking only by the frictional braking force is assumed. More specifically, the required hydraulic pressure Pmr is calculated to be "0" when the operation displacement Sbp is equal to or greater than "0" and less than the predetermined value bpo according to the operation map (hydraulic pressure map) EZpo. Here, the predetermined value bpo is a predetermined constant corresponding to the play of the braking operation member BR When the operation displacement Sbp is equal to or greater than the predetermined value bpo, the required hydraulic pressure Pmr is calculated to monotonically increase from "0" in accordance with an increase in the operation displacement Sbp.

In the hydraulic pressure conversion block HNP, the regenerative hydraulic pressure Prg is calculated based on the actual regenerative braking force Rga. Specifically, the actual regenerative braking force Rga is converted into a hydraulic pressure which is a physical quantity of the required hydraulic pressure Pmr, and the regenerative hydraulic pressure Prg is determined. The hydraulic pressure conversion is performed based on the braking device and the specifications around the wheels (pressure receiving area of the wheel cylinder WC, effective braking radius of the rotating member KT, friction coefficient of the friction member, dynamic load radius of the wheel WH, and others), The regenerative hydraulic pressure Prg is subtracted from the required hydraulic pressure Pmr, and a final target value (target hydraulic pressure) Pmt is calculated. Since the required hydraulic pressure Pmr is the required hydraulic pressure when the braking with only the frictional braking force is assumed, the regenerative hydraulic pressure Prg corresponding to the actual regenerative braking force Rga is subtracted from the required hydraulic pressure Pmr to determine the target hydraulic pressure Pmt required to be generated as the frictional braking force. When all the braking force of the wheel WH is covered by the regenerative braking force, the target hydraulic pressure Pmt is determined to be "0". On the other hand, when the regenerative braking is not performed (When all of the vehicle braking is performed by frictional braking), the target hydraulic pressure Pmt is calculated so as to coincide with the required hydraulic pressure Pmr because the target hydraulic pressure Pmt is "Prg=0".

In the rotation angle conversion block HNM, a final target value (target rotation angle) Mkst of the motor rotation angle is calculated based on the target hydraulic pressure Pmt. More specifically, the target hydraulic pressure Pmt is converted into a rotation angle which is a physical quantity of the target rotation angle Mkst. Here, the rotation angle conversion is determined based on the liquid consumption characteristic (i.e., the relationship between the brake fluid amount and the hydraulic pressure) of the braking device. It should be noted that the liquid consumption characteristic depends on the rigidity of the caliper CP, the rigidity of the friction member, and others, and can be determined experimentally. The second electric motor MTS is controlled based on the target rotation angle Mkst. Since the driving of the second electric motor MTS is the same as that of the variable characteristic control, a description thereof is omitted (see FIG. 3).

Next, the driving of the first electric motor MTF will be described. In the regenerative cooperative control, when the regenerative braking force Rga is generated by the regenerative braking device EDS, the generation of the hydraulic pressures Pma and Pmb is suppressed. Therefore, although the reaction force from the piston PNA is reduced, the assist force Fjs is controlled by the first electric motor MTF so that the operation characteristic CHbp is not deviated.

In the requested current calculation block IMFR, the requested current Imfr is calculated based on the operation force Fbp. The requested current Imfr is a target value of the current to the first electric motor MTF corresponding to the case where the target hydraulic pressure Pmt is "0". That is, the required current Imfr is a target motor current corresponding to the auxiliary force Fjs required when braking only by the regenerative braking force is assumed. More specifically, the requested current Imfr is calculated according to the operation map (rescue map) EZio so that the requested current Imfr monotonically increases from "0" in accordance with an increase in the operation force Fbp.

In the current conversion block MNI, a fluid pressure electric current Ipm is calculated based on the target hydraulic pressure Pmt. More specifically, the target hydraulic pressure Pmt is converted to a current value which is a physical quantity of the required current Imfr, and the fluid pressure electric current Ipm is determined. Here, the current conversion is determined based on the characteristics (torque constant and others) of the first electric motor MTF.

The fluid pressure electric current Ipm is added to the required current Imfr to calculate a final target value (target current) Imft of the motor current. In the case of "Pmt=0 (i.e., Pma=0)", the operating characteristic CHbp is determined by the elastic forces of the elastic bodies SBP, PSA, PSB, SPF, and SPI and the auxiliary force Fjs of the first electric motor MTF. In the case of "Prat>0 (That is, Pena>0)", since the reaction force from the piston PNA is applied, the required current Imfr is calculated by considering the liquid piezoelectric current Ipm to the required current Imfr so that the operation characteristic CHbp does not change. The first electric motor MTF is controlled based on the target current Imft. Since the driving of the first electric motor MTF is the same as that of the variable characteristic control, a description thereof is omitted (see FIG. 3).

A liquid piezoelectric flow Ipm is added to the required current Imfr to calculate a final target value (target current) Imft of the motor current. In the case of "Pmt=0 (i.e., Pma=0)", the operating characteristic CHp is determined by the elastic forces of the elastic bodies SBP, PSA, PSB, SPF, and SPI and the auxiliary force Fjs of the first electric motor MTF. In the case of "Pmt>0 (That is, Prim>0)", since the reaction force from the piston PNA is applied, the required current lmfr is calculated by considering the liquid piezoelectric current Ipm to the required current Imfr so that the operation characteristic CHbp does not change. The first electric motor MTF is controlled based on the target current Imft. Since the driving of the first electric motor MTF is the same as that of the variable characteristic control, a description thereof is omitted (see FIG. 3).

During execution of the regenerative cooperative control, the outputs of the two electric motors MTF and MTS are adjusted based on the braking operation amount Bpa and the actual regenerative braking force Rga. By this adjustment, the force Fbp acting on the input rod RDI and the displacement Sro of the output rod RDO are independently controlled. For example, if the hydraulic pressures Pma and Pmnb remain at "0" during the execution of the regenerative cooperative control, the operating force Fbp is generated by the elastic forces such as the elastic bodies (Springs) SIB, SPF, and SPI, and the auxiliary force fjs by the first electric motor MTF. In the regenerative cooperative control, the hydraulic pressure characteristic CHpm is adjusted based on the hydraulic pressure map EZpm and the regenerative braking force Rga to ensure a sufficient regenerative braking force. In accordance with this, the operation characteristic CHbp can be adjusted suitably on the basis of the assistant map EZio for calculating the assist force Fjs and the regenerative braking force Rga, and a good operation feeling of the braking operation member BP can be secured.

As in the case of the variable characteristic control, the target rotation angle Mkst and the target current Imft are calculated based on the operation amount Bpa (In other words, at least one of the operational displacement Sbp and the operational force Fbp). Since the specifications of the actuator BAC (gear ratio, pitch, etc.) and the outputs of the 2 electric motors MT are known, the operational displacement Sbp and the operational force Fbp can be converted between each other.

In the variable control in the regenerative cooperative control, the target regenerative braking force Rgt may be adopted instead of the actual regenerative braking force Rga. The actual regenerative braking force Rga is controlled to match the target regenerative braking force Rgt. The variable control may be executed based on the actual regenerative braking force Rga and the target regenerative braking force Rgt.

In the control of the second electric motor MTS, the first and second hydraulic pressures Pma and Pmb can be feedback controlled. More specifically, the deviation hPm between the target hydraulic pressure Pmt and the first and second hydraulic pressures Pma and Pmb is calculated. Then, the target rotation angle Mkst is finely adjusted so that the liquid pressure deviation hPm approaches "0". Feedback control based on the hydraulic pressure Pma or the like can improve the hydraulic control braking of the regenerative cooperative control. The first and second hydraulic pressures Pma and Pmb are detected by first and second hydraulic pressure sensors PMA and PMB provided in the master cylinder MC. Here, since "Pma=Pmb", either one of the first hydraulic pressure sensor PMA and the second hydraulic pressure sensor PMB may be omitted.

In the current conversion block HNI, although the liquid piezoelectric flow Ipm is calculated based on the target liquid pressure Pmt, the actual first and second liquid pressures Pma and Pmb are converted to current values which are physical quantities of the required current Imfr, and the fluid pressure electric current Ipm can be determined. This is because the second electric motor MTS is controlled so that the target hydraulic pressure Pmt coincides with the first and second hydraulic pressures Pma and Pmb.

Other Embodiments

Other embodiments (modified examples) will be described below. In these cases, the braking actuator BAC has the same effects as described above. That is, independent and suitable adjustment of the hydraulic characteristic CHpm and the operating characteristic CHbp can achieve suppression of the driver's discomfort.

In the above embodiment, the disk-type braking device is exemplified as a device for applying braking torque to the rotating member KT (i.e., the wheel WH). Alternatively, a drum type braking device (drum brake) may be employed. In the case of a drum brake, a brake drum is used instead of the caliper CP. The friction member is a brake shoe, and the rotary member KT is a brake drum.

In the above embodiment, the diagonal type (Also called "Type X") is exemplified as the two systems of hydraulic circuits (configuration of braking piping). Alternatively, an anteroposterior (which is also called "H type") configuration may be employed. In this case, the first fluid path HKA is fluidly connected to the front wheel cylinders WCfr and WCfl, and the second fluid path HKB is fluidly connected to the rear wheel cylinders WCrr and WCrl.

In the above-described embodiment of variable characteristic control, switching between the normal mode nmd and the sport mode smd by two modes is exemplified. However, the characteristic modes of "two" or more are employed. In addition to the change of the characteristics (Adjust) between the modes, the characteristics may be smoothly changed between the modes.

The invention claimed is:

1. A braking control device for vehicle, which pumps a braking fluid from a master cylinder to a wheel cylinder in accordance with an operation of a braking operation member of a vehicle to generate braking torque on a wheel of the, the braking control device for vehicle comprising:
an operation amount sensor that detects an operation amount of a braking operation member;
an input rod connected to the braking operation member;
an output rod which is movable parallel to a central axis of the input rod and which presses a piston in the master cylinder;
a first electric motor that generates an assist force to the input rod;
a second electric motor that adjust an output displacement of the output rod;
a differential mechanism which is configured by a first transmission mechanism that transmits an output of the first electric motor to the input rod, a second transmission mechanism that transmits an output of the second electric motor to the output rod, and a third transmission mechanism that transmits an output of the input rod to the output rod, and which adjust a relative movement between the input rod and the output rod;
a controller which controls, on the basis of the operation amount; the first electric motor and the second electric motor,
the controller being configured to control the first electric motor on the basis of an assistant map that control the assist force associated with the operation amount, to control the second electric motor on the basis of a displacement map that calculates the output displacement associated with the operation amount, and to modify the assistant map when changing the displacement map.

2. The braking control device for vehicle according claim 1, the controller configured to increase the assistant map when increasing the displacement map.

3. The braking control device for vehicle according claim 2, wherein the controller sets the assistant map so that the relationship between an operation displacement of the braking operation member and an operation force of the braking operation member is constant.

4. The braking control device for vehicle according claim 1, wherein the controller is configured to decrease the assistant map when increasing the displacement map.

5. The braking control device for vehicle according claim 4, wherein the controller sets the assistant map so that a value obtained by multiplying the operation displacement of the braking operation member by the operation force of the braking operation member becomes constant.

6. A braking control device for vehicle, which is applied to a vehicle equipped with a regenerative braking system that converts kinetic energy into electrical energy to obtain regenerative braking force and which pumps a braking fluid from a master cylinder to a wheel cylinder in accordance with an operation of a braking operation member of a vehicle to generate braking torque on a wheel of the vehicle, the braking control device for vehicle comprising:

an operation amount sensor that detects an operation amount of a braking operation member;

an input rod connected to the braking operation member;

an output rod which is movable parallel to a central axis of the input rod and which presses a piston in the master cylinder;

a first electric motor that generates an assist force to the input rod;

a second electric motor that adjust an output displacement of the output rod;

a differential mechanism which is configured by a first transmission mechanism that transmits an output of the first electric motor to the input rod, a second transmission mechanism that transmits an output of the second electric motor, and a third transmission mechanism that transmits an output of the input rod to the output rod, and which adjusts a relative movement between the input rod and the output rod; and a controller which controls the first electric motor and the second electric motor on the basis of the operation amount and the regenerative braking force.

* * * * *